United States Patent [19]
Muramatsu et al.

[11] Patent Number: 4,706,196
[45] Date of Patent: Nov. 10, 1987

[54] APPARATUS AND METHOD FOR INJECTING FUEL INTO ENGINE ACCORDING TO GROUP INJECTION SYSTEM

[75] Inventors: Toshihiko Muramatsu; Shigenori Isomura, both of Kariya; Takashi Harada, Hekinan, all of Japan

[73] Assignee: Nippondenso Co., Ltd., Kariya, Japan

[21] Appl. No.: 763,795

[22] Filed: Aug. 8, 1985

[30] Foreign Application Priority Data

Aug. 10, 1984 [JP] Japan ................................ 59-168706

[51] Int. Cl.$^4$ ............................................... F02D 5/02
[52] U.S. Cl. ............................ 364/431.05; 73/117.3; 73/116; 123/414; 123/480; 364/551
[58] Field of Search ....................... 364/431.05, 431.07, 364/551; 123/414, 480; 73/116, 117.3, 119 A; 324/167

[56] References Cited

U.S. PATENT DOCUMENTS

| | | | |
|---|---|---|---|
| 4,254,744 | 3/1981 | Mizote | 73/117.3 |
| 4,338,903 | 7/1982 | Bolinger | 73/116 |
| 4,378,004 | 3/1983 | Petrie | 123/414 |
| 4,387,429 | 6/1983 | Yamauchi et al. | 364/431.05 |
| 4,416,237 | 11/1983 | Aoki et al. | 123/480 |
| 4,515,131 | 5/1985 | Suzuki et al. | 123/414 |
| 4,583,174 | 4/1986 | Watanabe | 364/431.05 |

FOREIGN PATENT DOCUMENTS 53-104031 9/1978 Japan .
57-59032 4/1982 Japan .

Primary Examiner—Parshotam S. Lall
Attorney, Agent, or Firm—Cushman, Darby & Cushman

[57] ABSTRACT

In apparatus for injecting fuel into an internal combustion engine, a flip-flop used for frequency dividing an engine rotational angle signal is arranged to be reset when a basic injection pulse is not coincident with a cylinder-determining pulse signal. The basic injection pulse is produced by a Q/N charge-discharge circuit arranged to start charging a capacitor in response to a leading edge of an output pulse from the flip-flop and to start discharging the same in response to a trailing edge of the same where time constant on charging is constant and time constant on discharging is variable depending on the quantity Q of intake air of the engine. The basic injection pulse is used to produce final injection pulse with which fuel injection valves are operated where the width of the basic injection pulse determines the basic amount of fuel to be injected. After the flip-flop is reset, its output pulse is shifted by 180° CA, and thus the basic injection pulse TP occurs just before the final injection pulse thereby the latest engine operating conditions are reflected on the amount of fuel to be injected.

5 Claims, 11 Drawing Figures

APPARATUS AND METHOD FOR INJECTING FUEL INTO ENGINE ACCORDING TO GROUP INJECTION SYSTEM

BACKGROUND OF THE INVENTION

This invention relates generally to electronic fuel injection system for an internal combustion engine, and more particulaly to such a system arranged to inject fuel into a plurality of cylinders of a particular group.

According to so called group injection system, fuel is injected simultaneously into a plurality of cylinders of the same group where all the cylinders of an internal combustion engine are predivided into twc or more groups. One example of such conventional group injection system is disclosed in Japanese patent provisional publication No. 57-59032. This group injection system uses a D flip-flop as a member of its computing circuit, and a resultant fuel injection pulse produced through computation is apt to suffer from time lag or slow response. As a result, the amount of fuel to be injected is sometimes deviated from an ideal value which is suitable for present engine operating condition. Such deviation is especially noticeable in transient period of engine operation.

SUMMARY OF THE INVENTION

The present invention has been developed in order to remove the above-described drawbacks inherent to the conventional apparatus for injecting fuel according to group injection system.

It is, therefore, an object of the present invention to provide a new and useful apparatus and method with which the amount of fuel to be injected according to group injection is determined using engine operating conditions detected just before each fuel injection.

According to a feature of the present invention a flip-flop responsive to engine rotational angle signal so as to function as a frequency divider is arranged to be reset when a basic injection pulse does not coincide with a cylinder-determining pulse indicative of the combusion of a particular cylinder. As a result of such resetting, output pulse from the flip-flop is shifted by 180° CA so that the timinng of occurrence of the basic injection pulse is set to be just before fuel injection timing of injection valves of each group. Therefore, the width of actual or final injection pulse, for which injection valves are made open to inject fuel, is determined by reflecting the latest engine operating conditions, and thus the resultant amount of fuel is most suitable for the present engine operating conditions.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing an embodiment of the present invention, the above-mentioned conventional apparatus will be briefly discussed for a better understanding of the present invention.

Figure 1:
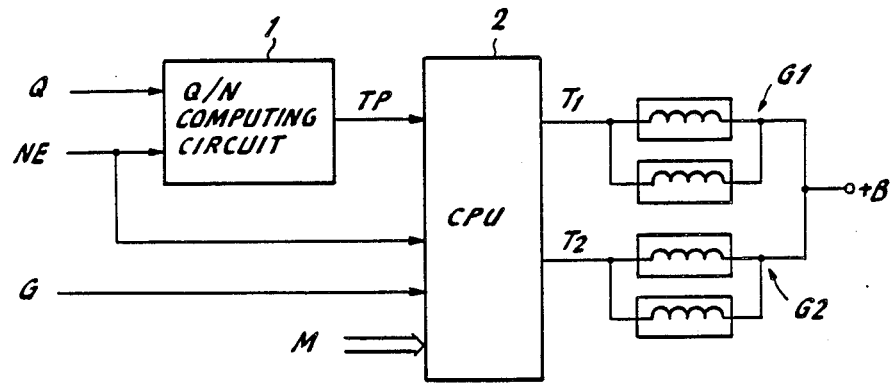
FIG. 1 is a diagram showing a circuit arrangement for a conventional apparatus for performing group fuel injection.

FIG. 1 shows a schematic diagram of a main part of the conventional apparatus for performing group fuel injection. The illustrated circuit configuration is designed to be adapted to four-cylinder engine. The circuit arrangeme comprises a Q/N comuting circuit 1 responsive to an output signal Q indicative of quantity of intake air of the engine from an airflow meter and to an output signal NE which is a pulse occurring at every 180° CA (crank angle) in synchronism with engine rotation from a rotational angle sensor. The Q/N computing circuit 1 produces an ouptut pulse signal TP, which is referred to as a basic injection pulse, whose pulse width is based on the input signals Q and NE. This output pulse TP is produced and sent to a CPU (central processing unit) 2 in synchronism with the signal NE. The CPU 2 receives the pulse signal TP and the signal NE. Furthermore, a pulse signal G from a cylinder-determining sensor is applied to the CPU 2 where the pulse signal is generated every 720° CA to indicate a reference rotational angle or position of the engine. The reference M indicates other singal(s) indicative of engine operating conditions from corresponding sensors.

Four cylinders of the engine are divided into two groups expressed in terms of G1 and G2 so that two injection valves for each group G1 or G2 are simultaneously operated. In detail, injection valves or injectors of the first group G1 are simutaneously driven by a first final injection pulse signal T1 in response to the signal NE, while the other injectors of the second group G2 are simutaneously driven by a second final injection pulse signal T2 in response to the signal G. In this way all the injectors are driven at an interval of 720° CA by the first and second final injection pulse signals T1 and T2 having a pulse width suitable for engine operating condition. To this end the CPU 2 computes the pulse width and produces the first and second final injection pulse signals T1 and T2 which are respectively fed to injectors of the first and second groups G1 and G2 as drive signals.

Figure 2:
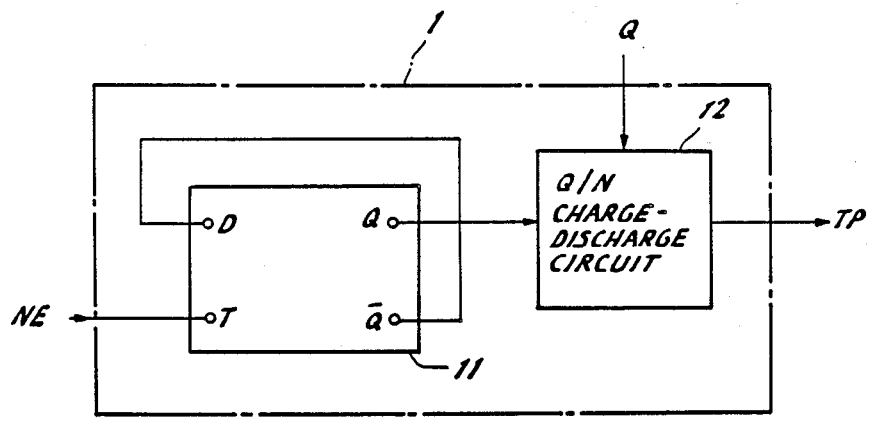
FIG. 2 is a diagram showing the structure of Q/N comnputing circuit shown in FIG. 1.

FIG. 2 shows a brief structure of the Q/N computing circuit 1 shown in FIG. 1. The Q/N computing circuit comprises a D flip-flop 11 and a Q/N charge-discharge circuit 12. The signal NE from the rotational angle sensor is fed to a clock input terminal T of the D flip-flop 11, while an inverting output terminal $\overline{Q}$ is connected to a data input terminal D. A noninverting output terminal Q is connected to an input terminal of the Q/N charge-discharge circuit 12 which starts charging in response to a leading edge of a first pulse from the noninverting output terminal Q, and starts discharging in response to a trailing edge of the first pulse. In other words, charging is started in response to a first pulse of the signal NE, and discharging is started in response to a second pulse of the signal NE. In the charging-discharging operation, charging is performed with a given charging time constant, whereas discharging is performed with a discharging time constant which is variable depending on the level of the signal Q from the airflow meter. A pulse is formed such that its pulse width equals discharging time period, and this pulse is outputted as a basic injection pulse signal TP.

Figure 3:
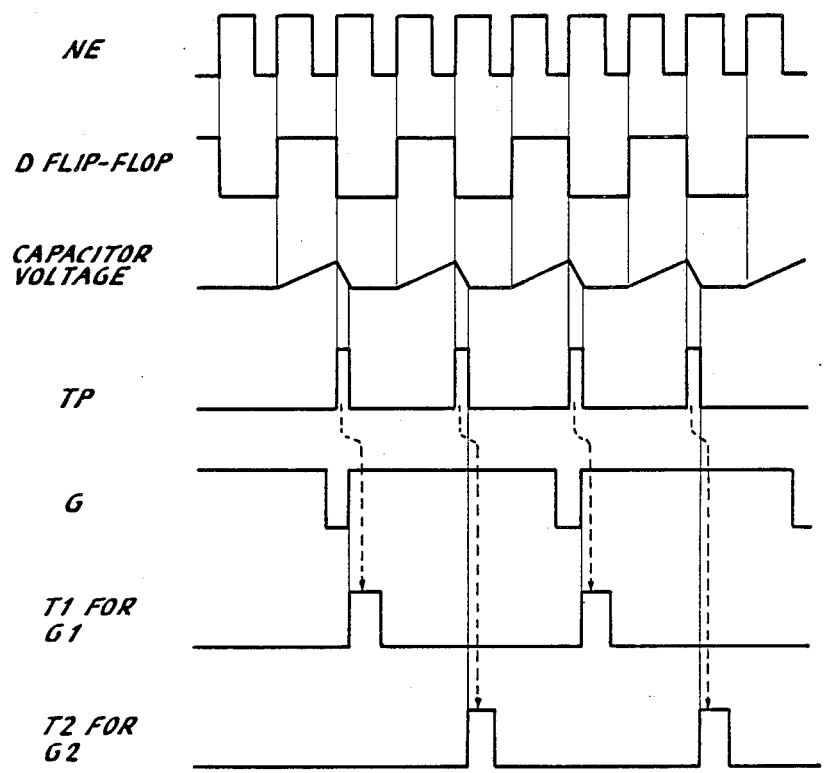
FIGS. 3 and 4 are timing charts useful for understanding the operation of the conventional circuit of FIGS. 1 and 2.
Figure 4:
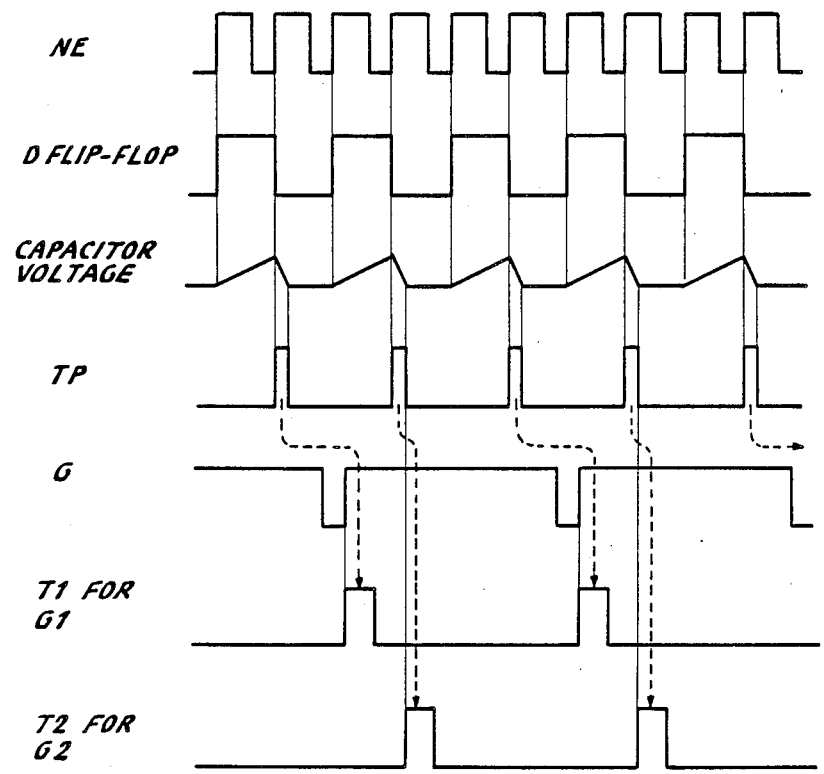

The above-described conventional circuit, however, suffers from a problem which occurs due to the characteristic of the D flip-flop 11. In detail, the polarity of the output signal from the D flip-flop 11 may be one of two cases even though the input signal NE is unchanged. Therefore, even though the signals NE and G have constant relationship as shown in FIGS. 3 and 4, the D flip-flop 11 has a change to produce different polarity output signals. In the case that the polarity of the output signal from the D flip-flop 11 is of that shown in FIG. 3, the basic injection pulse TP is produced just before the rising of the signal G. Therefore, injection pulse signal T1 for the first group G1 has a pulse width which is based on engine operating condition substantially similar to that at fuel injection timing even if the engine is in transient period such as sudden acceleration or sudden decceleration. However, when the polarity of the output signal from the D flip-flop 11 is of that shown in FIG. 4, the basic injection pulse TP is produced relatively long time before the rising of the signal G. Therefore, injection pulse signal T1 for the first group G1 has a pulse width which is based on engine operating condition greately different from that at fuel injection timing when the engine is in transient period. As a result, the amount of fuel actually injected into engine cylinders is apt to deviate from an optimal value suitable for the present engine operating condition due to time lag or slow response.

Figure 5:
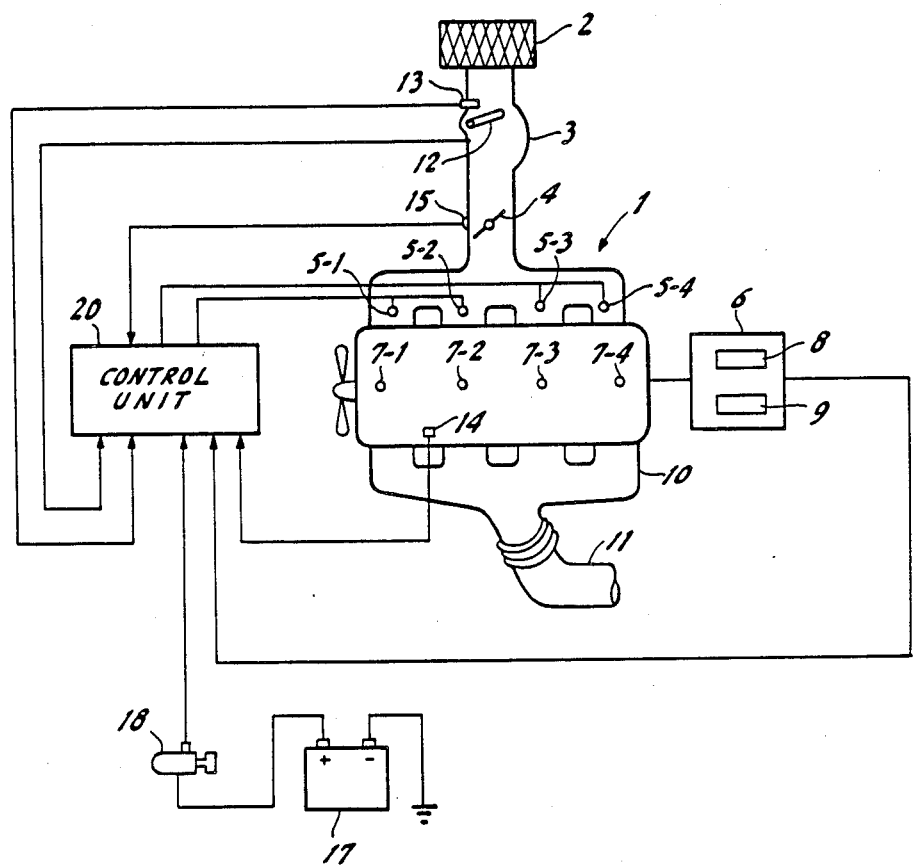
FIG. 5 is a schematic diagram of a fuel supply system of group injection to which the present invention is adapted.

Referring now to FIG. 5, an engine system to which an embodiment of the present invention is applied is shown. The illustrated engine system is a known spark ignition four-cylinder internal combustion engine used for a motor vehicle. The engine 1 is arranged to be supplied with fuel via injectors or electromagnetic injection valves 5-1, 5-2, 5-3 and 5-4 which are divided into two groups G1 and G2 such that the first group G1 includes the injectors 5-1 and 5-2, and the second group G2 includes the injectiors 5-3 and 5-4. The injectors 5-1 through 5-4 are generally indicated at the reference 5. All these injectors 5 are supplied with fuel under pressure where the pressure is kept constant. The reference 2 is an air cleaner provided at an inlet of an intake pipe 3 of the engine 1. The reference 4 is a throttle valve. The reference 6 is a distributor used for distributing high voltage to respective spark plugs 7-1, 7-2, 7-3 and 7-4 respectively provided to cylinders. The distributor 6 is arranged to rotate once per two revolutions of the engine crankshaft, and comprises a rotational angle sensor 8 for detecting the rotational angle of the engine, and a reference rotational angle or position sensor 9. This reference rotational angle sensor 9 functions as a cylinder-determining sensor because a specific cylinder on combustion is detected thereby. The reference 10 is an exhaust manifold, and the reference 11 is an exhaust pipe coupled with the exhaust manifold 10.

The intake pipe 3 is equipped with an airflow meter 12 operating as an intake air quantity sensor. This airflow meter 12 comprises a potentiometer producing an analog voltage indicative of the intake airflow. The reference 13 is an intake air temperature sensor for detecting the temperature of intake air. The reference 14 is a coolant temperature sensor for detecting the temperature of engine coolant, and therefore engine warming up condition. The throttle valve 4 is associated with an idle switch 15 used for detecting whether the throttle opening degree is below a predetermined setting value.

A control unit 20 is arranged to receive output signals from the various sensors 8, 9, and 12-15 for computing fuel injection amount and ignition timing on the basis of these signals. More specifically, the control unit 20 determines energizing and deenergizing timings of the ignition coil 16 (see FIG. 6), and opening and closing timings of the electromagnetic fuel injection valves 5-1 to 5-4 to control ignition timing and fuel injection amount. The reference 17 is a battery, and the reference 18 being a key switch interposed between the battery 18 and the control unit 20.

Figure 6:
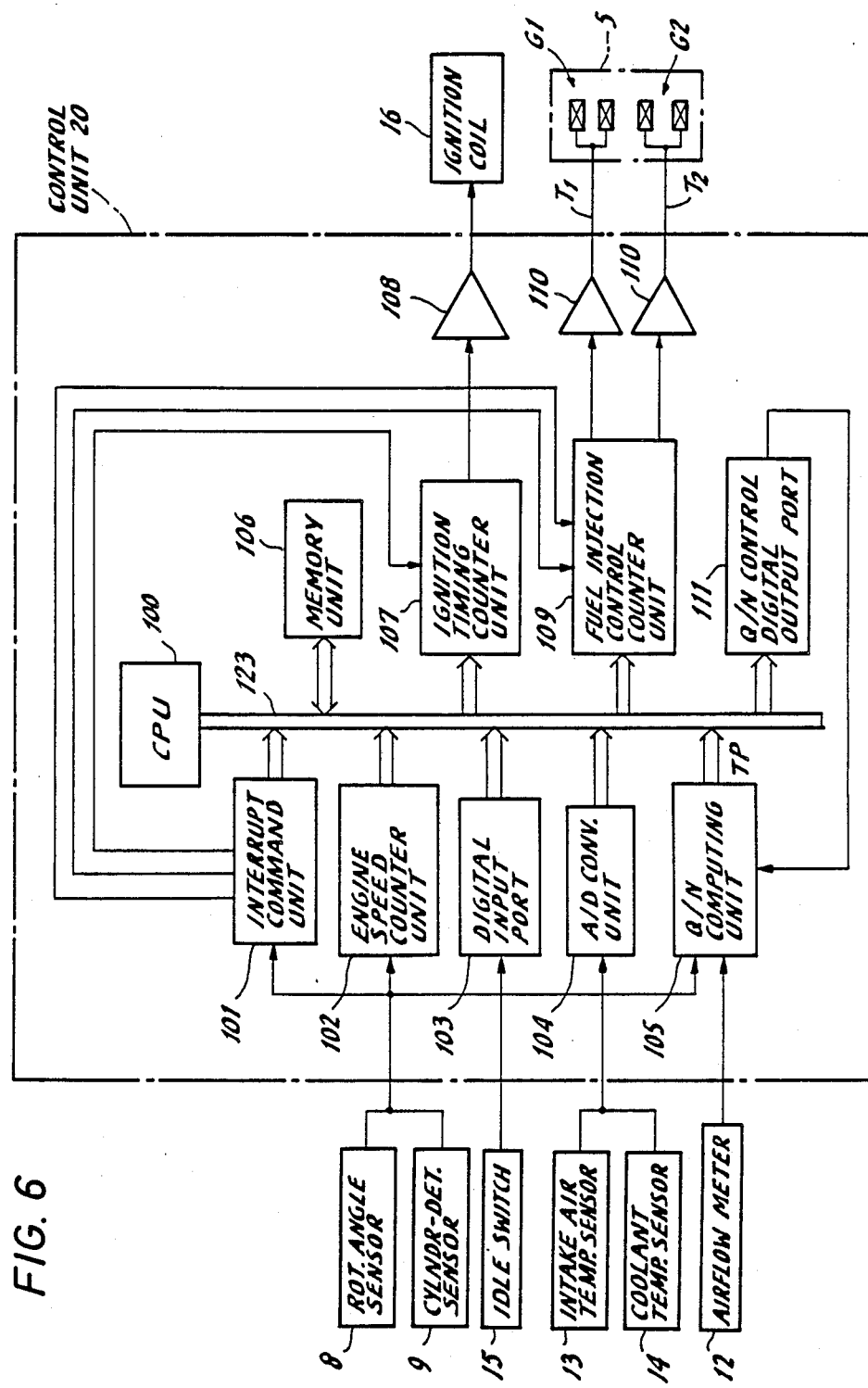
FIG. 6 is a block diagram of a control unit used in the system of FIG. 5.

The control unit 20 of FIG. 5 has a structure shown in FIG. 6. The reference 100 is a CPU for computing ignition timing as well as fuel injection amount. The reference 101 is an interrupt command unit, the reference 102 being a rotational speed counter unit for computing engine speed by counting or measuring a period of a given rotational angle using a clock signal of a predetermined frequency. The reference 103 is a digital input port responsive to a detection signal from the idle switch 15 for sending the same to the CPU 100. The reference 104 is an A/D conversion processing unit including a multiplexer for selecting detection signals from the sensors 13 and 14 in sequence and A/D converting selected information to produce a digital signal which can be read by the CPU 100. The reference 105 is a Q/N computing unit having a built-in capacitor (not shown) arranged to be charged and discharged in response to the output signal from the rotational angle sensor 8 for producing a basic injection pulse TP. The output signal Q from the airflow meter 12 is fed to the Q/N computing unit so that time constant on discharging is variable in accordance with the quantity Q of intake air. Output information from these respective units 101 to 105 is fed via a common bus 123 to the CPU 100.

The reference 106 is a memory unit for storing control programs of the CPU 100 and data from the above-mentioned various units 101, 102, 103, 104 and 105. Data transmission between the memory unit 106 and the CPU 100 is also performed via the common bus 123. The reference 107 is an ignition timing control counter unit including registers. This counter unit 107 converts a digital signal indicative of ignition timing from the CPU 100 into a signal indicative rotational angle (crank angle) corresponding to energizing and deenergizing timings of the ignition coil. The reference 108 is a power amplifier responsive to an output signal from the counter unit 107 for energizing and deenergizing the ignition coil 16 in accordance with an output signal from the counter unit 107 thereby controlling ignition timing.

The reference 109 is a fuel injection timing control counter unit including registers. This counter unit 109 comprises two down counters having the same function. Each of the down counters convers the digital signal indicative of the opening duration of the fuel injection valves 5 representing the fuel injection amount, which is computed by the CPU 100, into a pulse signal having a pulse width giving the valve-opening duration. The reference 110 indicates two power amplifiers respectively responsive to the two down counters of the counter unit 109. The reference 111 is a Q/N control digital output port in which the feature of the present invention resides. The CPU 100 determines whether the basic injection pulse signal TP from the Q/N computing unit 105 is coincident with the cylinder-determination signal G from the cylinder determining sensor 9. As a result, when coincidence is established, no output signal is produced by the Q/N control digital output port 111. On the other hand, when coincidence is not established, a digital control siganl CS is outputted from the Q/N control digital output port 111 to be fed to the Q/N computing unit 105.

The operation of the CPU 100 of FIG. 6 will be further described in detail with reference to a flowchart of FIG. 7. When execution of a main routine is started at a step 100, initialization is made in a step 1001 to reset various data to initial values. In a subsequent step 1002, the signals NE and G are taken or read. Then in a step 1003, the basic injection pulse TP is read. In a following step 1004, it is checked wheter the read signal G is in ON state or not. If ON state, a step 1005 is executed to check whether the signal NE is in OFF state or not. On the other hand, if the signal G is not in ON state, operational flow goes to a step 1008. In the step 1005, if the signal NE is in OFF state, a step 1006 is executed, and on the other hand if the signal NE is not in OFF state, operational flow goes to the step 1008. In the step 1006, it is checked whether the signal TP is in ON state or not, and if not ON state, a step 1007 is executed. On the other hand, if ON state, then the operational flow goes to the step 1008. In the step 1007, a control signal CS is outputted from the Q/N control digital output port 111, and in a following step 1008, processing for determining ignition timing is carried out so that ignition timing suitable for the present engine operating condition is obtained. Since this step or routine 1008 is well known in the art, detailed operations therein is omitted. In a following step 1009, processing for determining fuel amount to be injected is carried out. More specifically, the amount of fuel to be actually injected is finally determined by correcting or modifying the width of the basic injection pulse TP using various engine parameters. The way of correction or modification of the basic injection pulse for obtaining final or actual injection pulse is well known in the art, and thus detailed operations in the step or routine 1009 are omitted. After completion of the step 1009, the operational flow returns to the step 1002.

Figure 7:
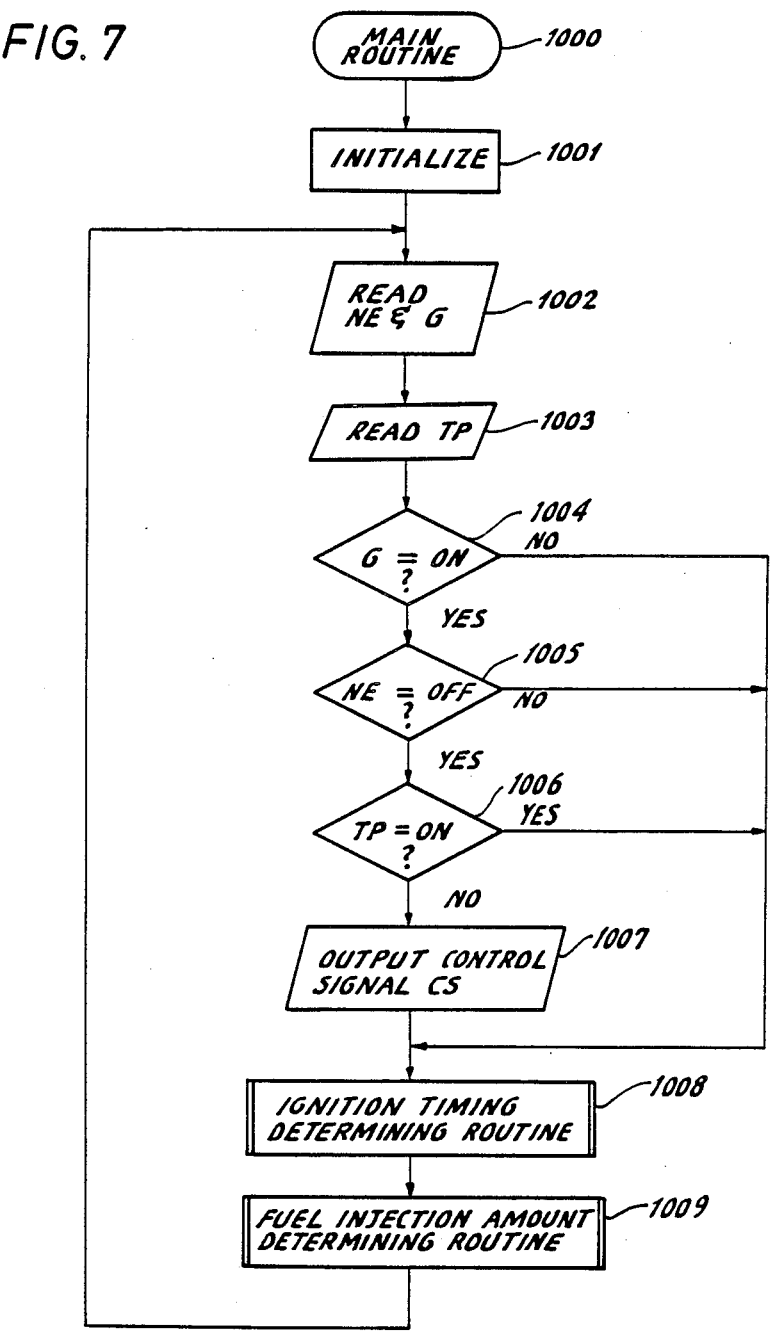
FIG. 7 is flowchart showing a program for a computer included in the control unit of FIG. 6.
Figure 8:
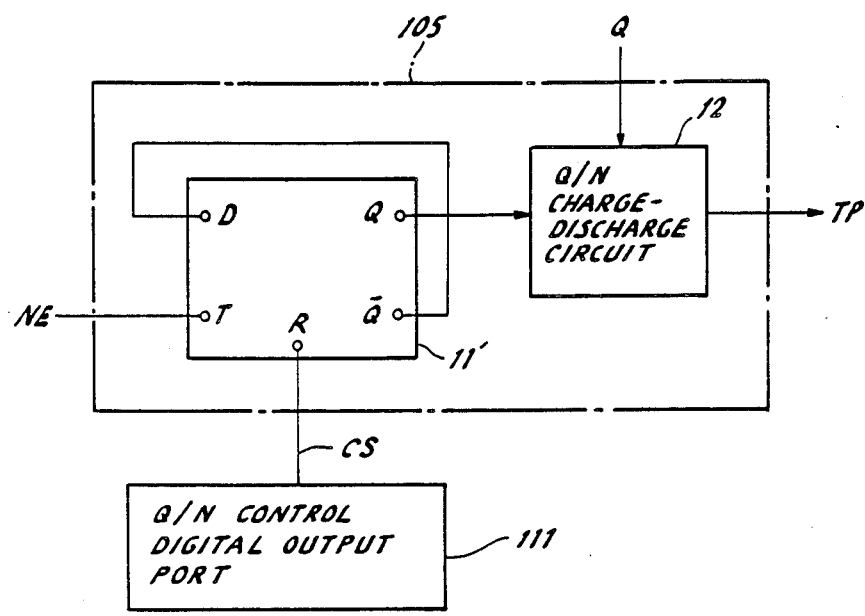
FIG. 8 is a block diagram showing the relationship between Q/N computing circuit and Q/N control digital output port both shown in FIG. 6.

FIG. 8 shows a block diagram of the Q/N computing unit 105 connected to the Q/N control digital output port 111 both shown in FIG. 7. The Q/N computing unit 105 comprises a D flip-flop 11' used as a frequency divider, and a Q/N charge-discharge circuit. The frequency divider 11' receives the signal NE so as to output the signal level at the data input terminal D thereof in response to a leading edge of the signal NE. As a result, ½ frequency divided signals is produced to be fed to the Q/N charge-discharge circuit 12. The Q/N charge-discharge circuit 12 charges a built-in capacitor (not shown) with a predetermined charging time constant when the frequency divided signal is of high level, and when the frequency divided signal turns to low, the capacitor is discharged with a discharging time constant variable depending on the quantity of intake air defined by the signal Q. This means that the amount of charging is a constant value determined by circuit characteristics whereas the amount of discharging is determined by the intake airflow, and thus the width of the basic injection pulse TP is determined by the discharging time duration. The Q/N charge-discharge circuit 12 per se is substantially the same as that shown in FIG. 2, and a detailed structure is seen in prior art references, such as U.S. Pat. No. 3,750,631 issued on Aug. 7, 1973.

When it is determined that the basic injection pulse is not coincident with the signal G by the operation of the CPU 100, the control signal CS is produced by the Q/N control digital output port 111. This control signal CS is applied to a reset terminal R of the frequency divider 11', i.e. the D flip-flop, so as to cause the output signal from the frequency divider 111 assuming high level to be forcibly turned to low level. In other words, the capacitor in the Q/N charge-discharge circuit 12, which capacitor has been in charging state, is now put in discharging state. As a result, the frequency-divided signal from the frequency divider 11' is shifted by 180° CA which is a period of the engine rotation signal NE, and therefore, the basic injection pulse TP will conincide with the signal G thereafter.

Figure 9:
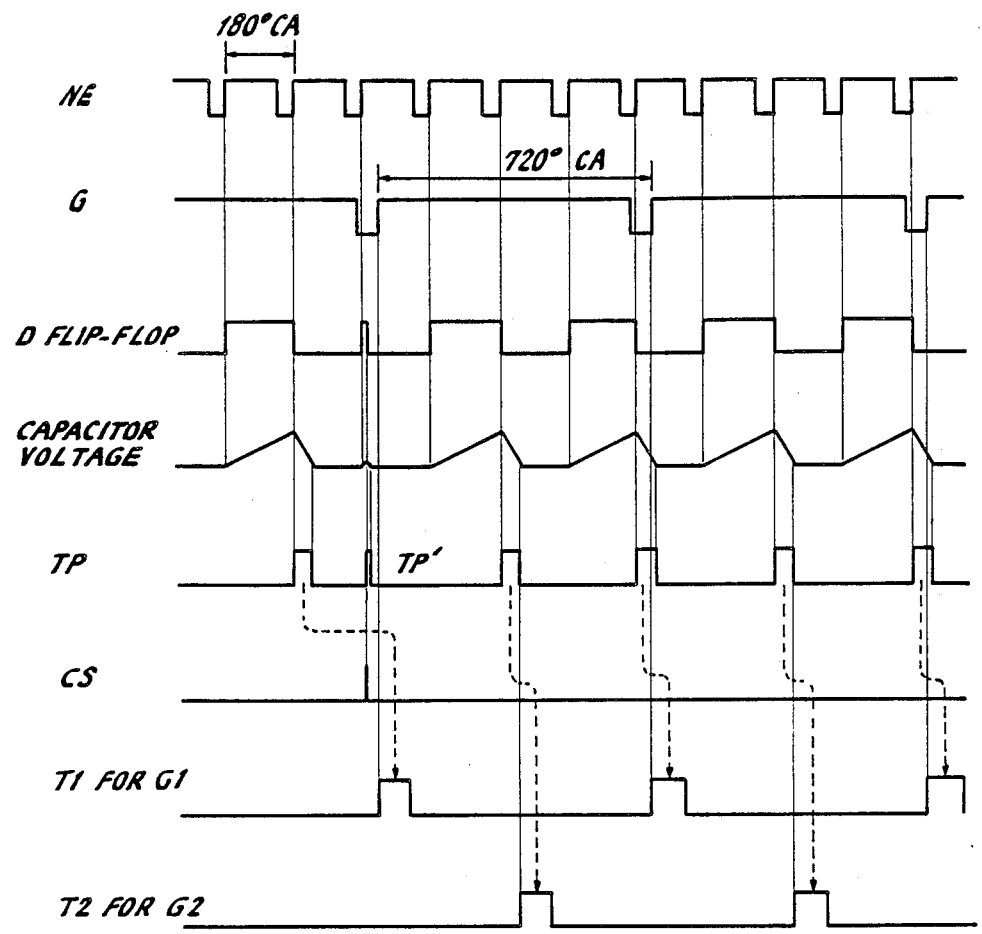
FIG. 9 is a timing chart useful for understanding the operation of the apparatus according to the present invention.

FIG. 9 is a time chart useful for understanding the operation of the above-described embodiment of the present invention. When the signal NE turns to high level during low level period of the signal G, the output from the D flip-flop turns to high level, and therefore the Q/N charge-discharge circuit 12 starts charging. Let us assume that the signal G is in ON state, the signal NE is in OFF state and the signal TP is in OFF state. It is to be noted that the signals NE and G are negative going pulses, whereas the signal TP is a positive going pulse. Therefore, the signal G is of low level when in ON state, and the signal NE is of high level when in OFF state, the signal TP being of high level when in ON state. Under such condition, the determination in the step 1004 of the flowchart of FIG. 7 becomes YES, the determination in the step 1005 also becomes YES, and then the determination in the step 1006 becomes NO. As a result the step 1007 is executed to produce the control signal CS which is fed from the Q/N control digital output port to the reset terminal R of the D flip-flop 11'.

In receipt of the control signal CS the D flip-flop is inverted such that its high level output at its noninverting output Q turns to low level. With this inversion the Q/N charge-discharge circuit 12 starts discharging. As a result, the Q/N charge-discharge circuit 12 produces a basic injection pulse TP'. After this, when the signal NE turns high, the output Q from the D flip-flop 11' turns from low level to high level. Summarizing the operation of the D flip-flop 11', the D flip-flop 11' is reset in receipt of the control signal CS so that its output Q has a level which is opposite to the level of the same before the reset. Therefore, the state of the output signal from the output Q of the D flip flop 11' is shifted by 180° CA which is a period of the signal NE.

In this way, once the D flip-flop 11' is reset, the basic injection pulse TP is accurately synchronized such that every other basic injection pulse TP conincides with the cylinder determination pulse G. Therefore, the width of final injection pulse signals T1 and T2 respectively applied to the injectors of the first and second groups G1 and G2 is determined on the basis of the pulse width of the basic injection pulse TP which occurs just before the final injection pulses T1 and T2 are genenrated. Therefore, engine operating conditions are effectively reflected so that the amount of fuel actually injected into engine cylinders is suitable for present engine operating conditions. As a result so called drivability is bettered.

Figure 10:
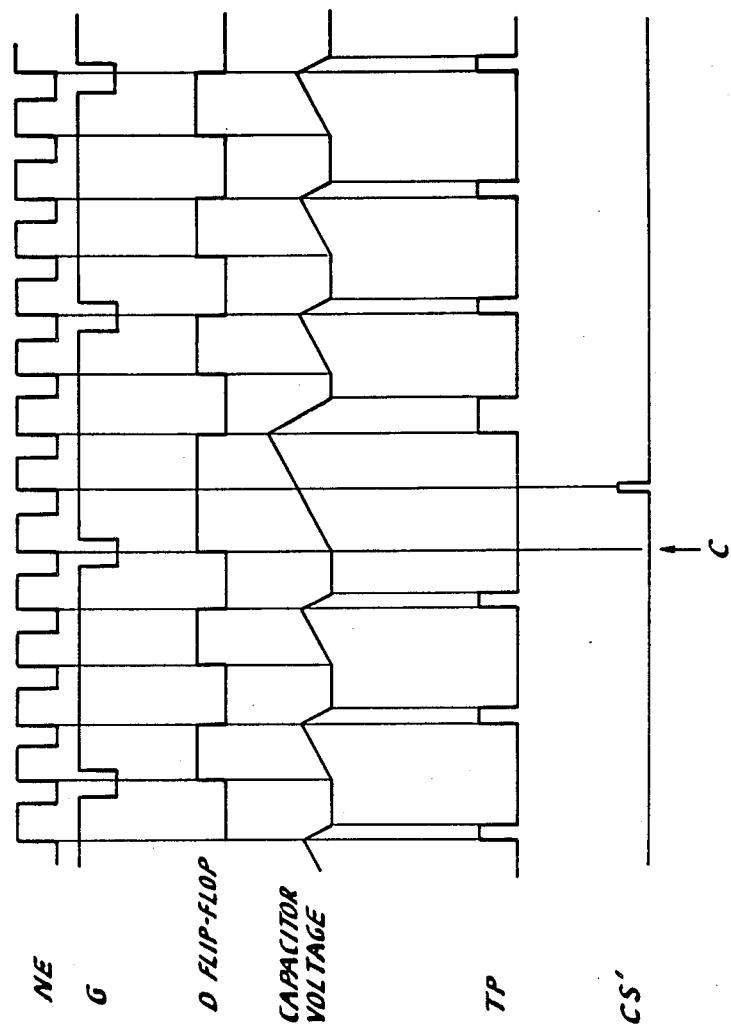
FIGS. 10 and 11 are timing charts respectively showing modifications of the embdiment described with reference to FIG. 5 through FIG. 9.

FIG. 10 shows a particular case where the basic injection pulse TP is not generated during on state (low level) of the signal G (see timing C). In this case, a control signal CS' is produced so as to disable the detection of a leading edge of a subsequent signal NE. With this arrangemnet fuel injection amount can be controlled to be suitable for the present engine operating conditions in the same manner as in the above-described embodiment.

Figure 11:
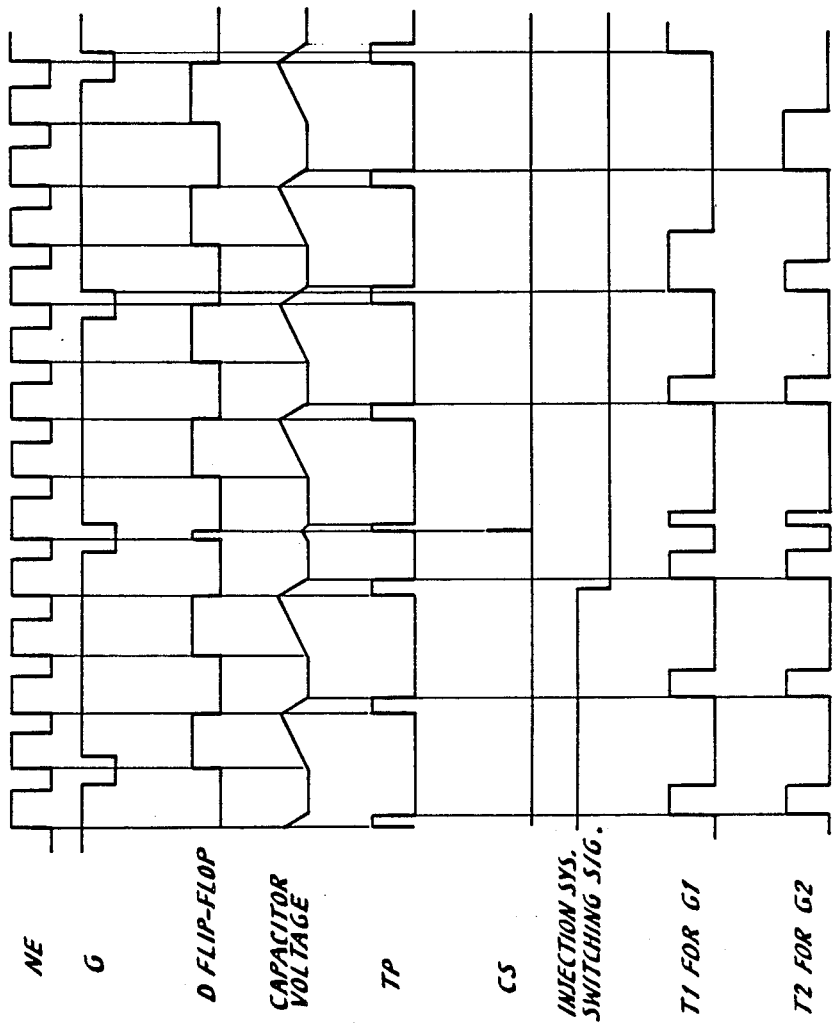

FIG. 11 shows another modification with which fuel amount can be accurately controlled so as to be suitable for the present engine operating conditions even if fuel injection sytems is changed from simulataneous injection system to group injection system.

The above-described embodiments are just examples of the present invention, and therefore, it will be apparent for those skilled in the art that many modifications and variations may be made without departing from the scope of the present invention.

What is claimed is:

1. Apparatus for controlling fuel injection, for an internal combustion engine, comprising:
    (a) a rotational angle sensor for generating a pulse signal synchronized with the rotation of said engine;
    (b) a cylinder-determining sensor for producing a pulse signal indicative of a reference rotational angle of said engine;
    (c) an airflow meter for producing an output signal indicative of intake airflow sucked into said engine;
    (d) a flip-flop responsive to said pulse signal synchronized with engine rotation for frequency dividing the same;
    (e) a charge-discharge circuit arranged to start charging in response to an output signal from said flip-flop with a first time constant and to start discharging in response to an invesion of said output signal from said flip-flop with a second time constant, one of said first and second time constants being variable in accordance with said output signal from said airflow meter, said charge-discharge circuit having means for producing a basic injection pulse whose width is defined by a period of time required for discharging;
    (f) computing means responsive to said basic injection pulse, said pulse signal from said cylinder-determining sensor, and said pulse signal from said rotational angle sensor;
        for generating plural groups of final injection pulse signals to be respectively fed to respective groups of fuel injectors of said engine such that final injection pulse signal to be fed to a particular group of fuel injectors are generated with a timing of said pulse from said cylinder-determining sensor;
        for determining whether all said basic injection pulse, said pulse from rotational angle sensor and said pulse signal from said cylinder-determining sensor coincide with each other or not; and
        for producing a control signal when the coninicidence is not detected; and
    (g) means for causing said flip-flop to produce said output signal which is shifted with respect to said output signal produced before receiving said control signal so that charging and discharging operation of said charge-discharge circuit is shifted accordingly.

2. Apparatus as claimed in claim 1, wherein said means for causing said flip-flop comprises means for resetting said flip-flop.

3. Apparatus as claimed in claim 1, wherein said means for causing said flip-flop is arranged to shift said basic injection pulse by 180° CA.

4. Apparatus as claimed in claim 1, wherein said flip-flop comprises a D flip-flop with a reset terminal.

5. A method of controlling fuel injection, for an internal combustion engine, said method comprising the steps of:
    (a) generating a pulse signal synchronized with the rotation of said engine;
    (b) producing a pulse signal indicative of a reference rotational angle of said engine;
    (c) producing an output signal indicative of intake airflow sucked into said engine;
    (d) frequency dividing said pulse signal synchronized with engine rotation by way of a flip-flop;
    (e) starting charging a charge-discharge circuit in response to an output signal from said flip-flop with a first time constant and starting discharging in response to an invesion of said output signal from said flip-flop with a second time constant, one of said first and second time constants being variable in accordance with said output signal indicative of intake airflow, said charge-discharge circuit producing a basic injection pulse whose width is defined by a period of time required for discharging;
    (f) generating plural groups of final injection pulse signals to be respectively fed to respective groups of fuel injectors of said engine such that final injection pulse signal to be fed to a particular group of fuel injectors are generated with a timing of said pulse indicative of a reference rotational angle of said engine;
    (g) determining whether all said basic injection pulse, said pulse synchronized with the rotation of said engine, and said pulse signal indicative of a reference rotational angle of said engine coincide with each other or not; and
    (h) producing a control signal when the conincidence is not detected; and
    (i) causing said flip-flop to produce said output signal which is shifted with respect to said output signal produced before receiving said control signal so that charging and discharging operation of said charge-discharge circuit is shifted accordingly.

* * * * *